(12) United States Patent
Haveliwala et al.

(10) Patent No.: US 8,032,483 B1
(45) Date of Patent: Oct. 4, 2011

(54) USING GAME RESPONSES TO GATHER DATA

(75) Inventors: Taher Haveliwala, Fremont, CA (US); Benedict Gomes, Mountain View, CA (US); Amitabh K. Singhal, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 284 days.

(21) Appl. No.: 11/169,279

(22) Filed: Jun. 29, 2005

Related U.S. Application Data

(60) Provisional application No. 60/632,706, filed on Dec. 3, 2004.

(51) Int. Cl.
| | |
|---|---|
| G06F 7/00 | (2006.01) |
| G06F 17/00 | (2006.01) |
| G06E 1/00 | (2006.01) |
| G06E 3/00 | (2006.01) |
| G06F 15/18 | (2006.01) |
| G06G 7/00 | (2006.01) |
| G06N 3/08 | (2006.01) |

(52) U.S. Cl. ............ 707/602; 707/603; 706/20; 706/21; 706/25

(58) Field of Classification Search .................. None
See application file for complete search history.

(56) References Cited

U.S. PATENT DOCUMENTS

| 6,613,101 B2 * | 9/2003 | Mander et al. ................. 715/273 |
| 2005/0014118 A1 | 1/2005 | Von Ahn Arellano |
| 2005/0065813 A1 * | 3/2005 | Mishelevich et al. .............. 705/2 |

FOREIGN PATENT DOCUMENTS

| JP | 7-148350 | 6/1995 |
| JP | 8-16807 | 1/1996 |
| JP | 2002-35411 | 2/2002 |
| JP | 2002-051282 | 2/2002 |
| JP | 2002-159741 | 6/2002 |
| JP | 2002-175135 | 6/2002 |
| JP | 2002-253840 | 9/2002 |

OTHER PUBLICATIONS

"Labeling Images with a Computer Game" published on Apr. 24, 2004 written by Luis von Ahn and Laura Dabbish available at: http://portal.acm.org/citation.cfm?id=985733.*
Yahoo! Answers archived on Dec. 31, 2005 at: http://web.archive.org/web/20051231141030/http://answers.yahoo.com/.*
Ahn, L. von, Blum, M., Hopper, N.J., and Langford, J., Captcha: Using Hard AI Problems for Security, Web page, www.captcha.net, 2003.
Ahn, L. von, Blum, M., and Langford, J., Telling Humans and Computers Apart Automatically, Communications of the ACM, vol. 47, No. 2, pp. 57-60 (2004).
Luis von Ahn et al.: "Labeling Images with a Computer Game"; ACM-CHI, Apr. 2004, 8 pages.
Laura Dabbish et al.: "Coordinating Communication: Awareness Displays and Interruption"; CHI2003: New Horizons, Apr. 2003, pp. 786-787.
Henry Schneiderman et al.: "Object Detection Using the Statistics of Parts"; International Journal of Computer Vision, 2002, 58 pages.

(Continued)

*Primary Examiner* — Charles Rones
*Assistant Examiner* — Harold A Hotelling
(74) *Attorney, Agent, or Firm* — Harrity & Harrity, LLP

(57) ABSTRACT

A system provides images or questions to multiple game participants and receives labels or answers in response thereto. The system uses the labels or answers for various data gathering purposes.

39 Claims, 13 Drawing Sheets

OTHER PUBLICATIONS

P. Duygulu et al.: "Object Recognition as Machine Translation: Learning a Lexicon for a Fixed Image Vocabulary", in: A Heyden et al. (Eds.): ECCV 2002, LNCS 2353, pp. 97-112.
Homepage http://pro.corbis.com/default.aspx.
Homepage http://www.gettyimages.com/.
Homepage http://www.hotornot.com/.
Carneiro, "Supervised Learning of Semantic Classes for Image Annotation and Retrieval", IEEE Transactions on Pattern Analysis and Machine Intelligence, vol. 29, No. 3, Match 2007, pp. 394-410.
http://en.wikipedia.org/wiki/Scattergories, retrieved Dec. 19, 2008.
Vuurpijl, "Vind(x): Using the User Through Cooperative Annotation", retrieved Dec. 19, 2008, published 2002.
Carnegie Mellon University, "The ESP Game", www.espgame.org, 2004, 1 page.
Carnegie Mellon University, "The ESP Game", www.captcha.net/esp-search.html, 2004, 1 page.
Carnegie Mellon University, "The ESP Game", 2004, 3 pages.

* cited by examiner

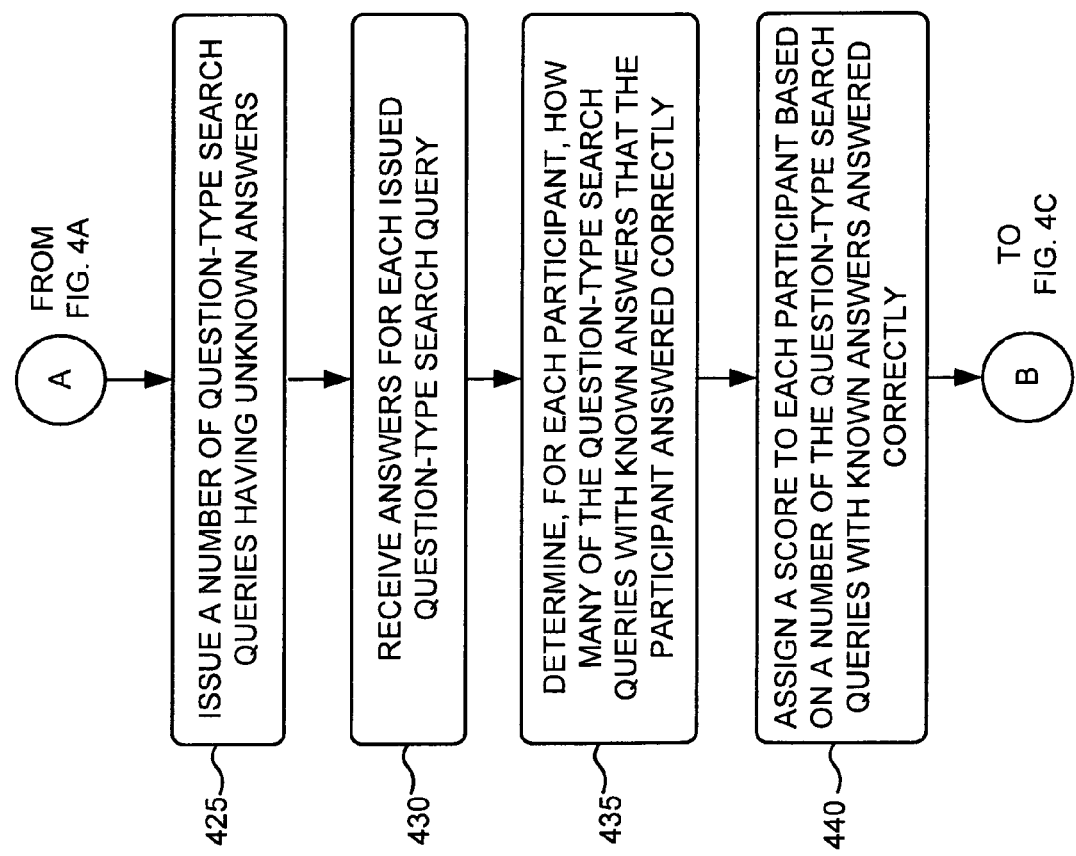

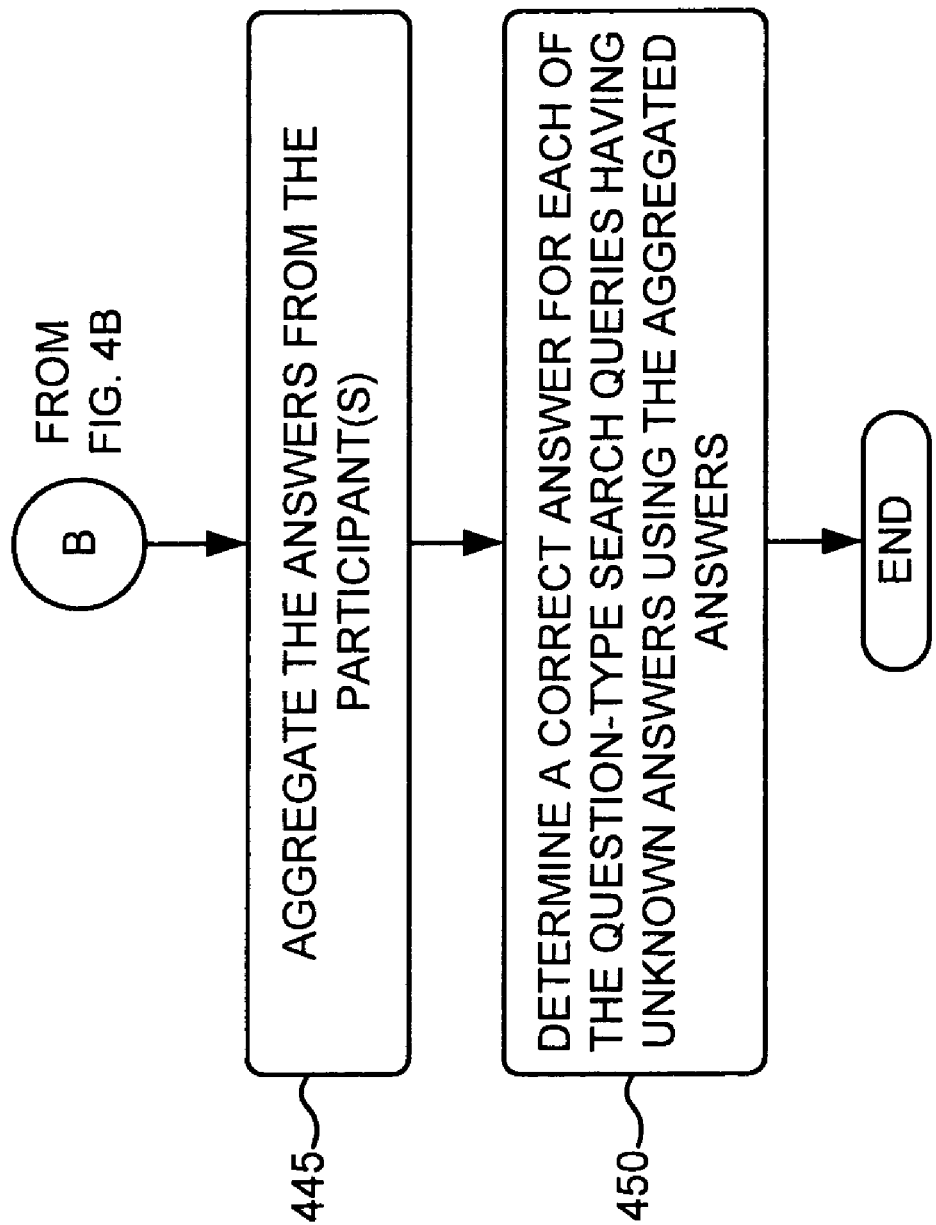

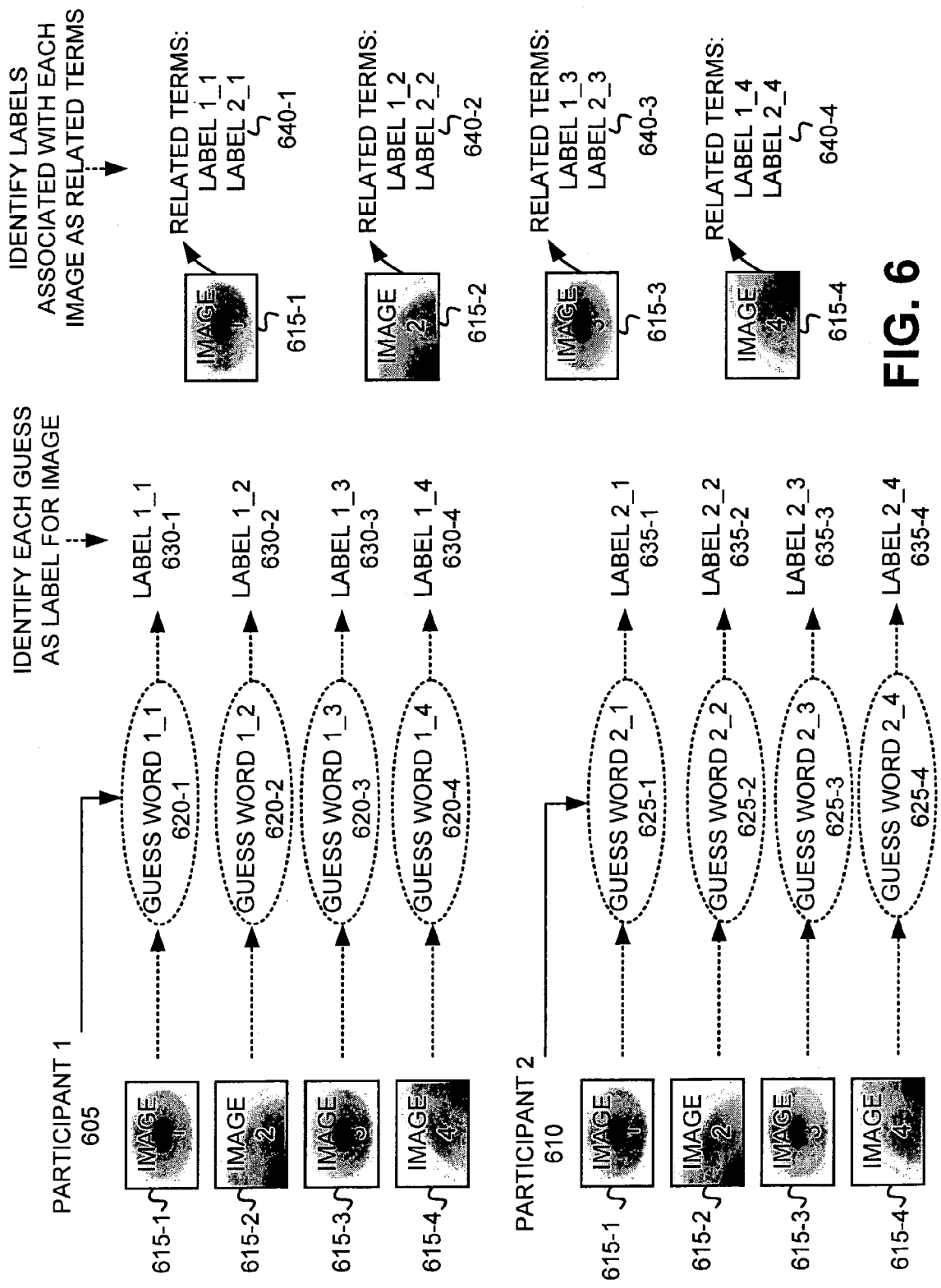

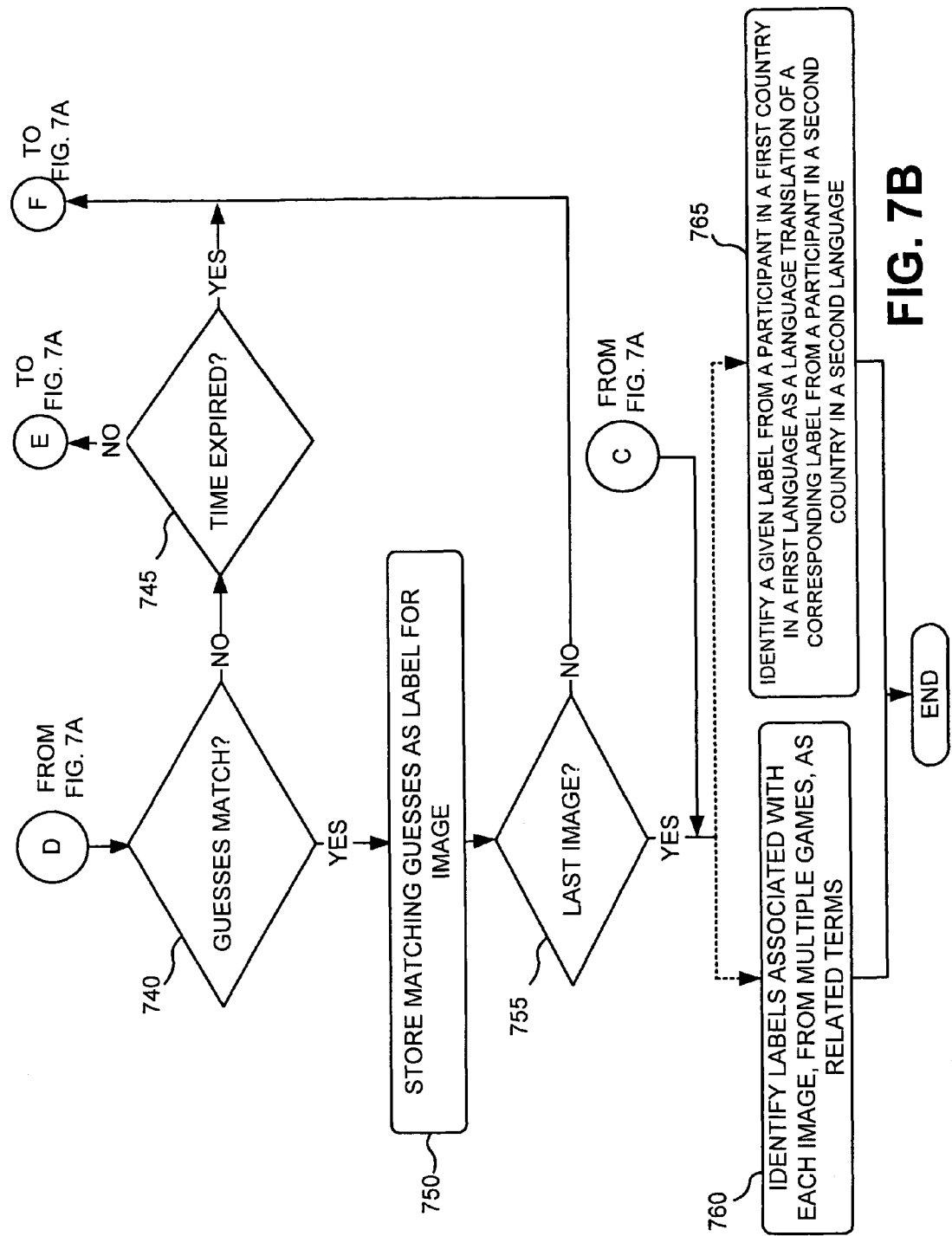

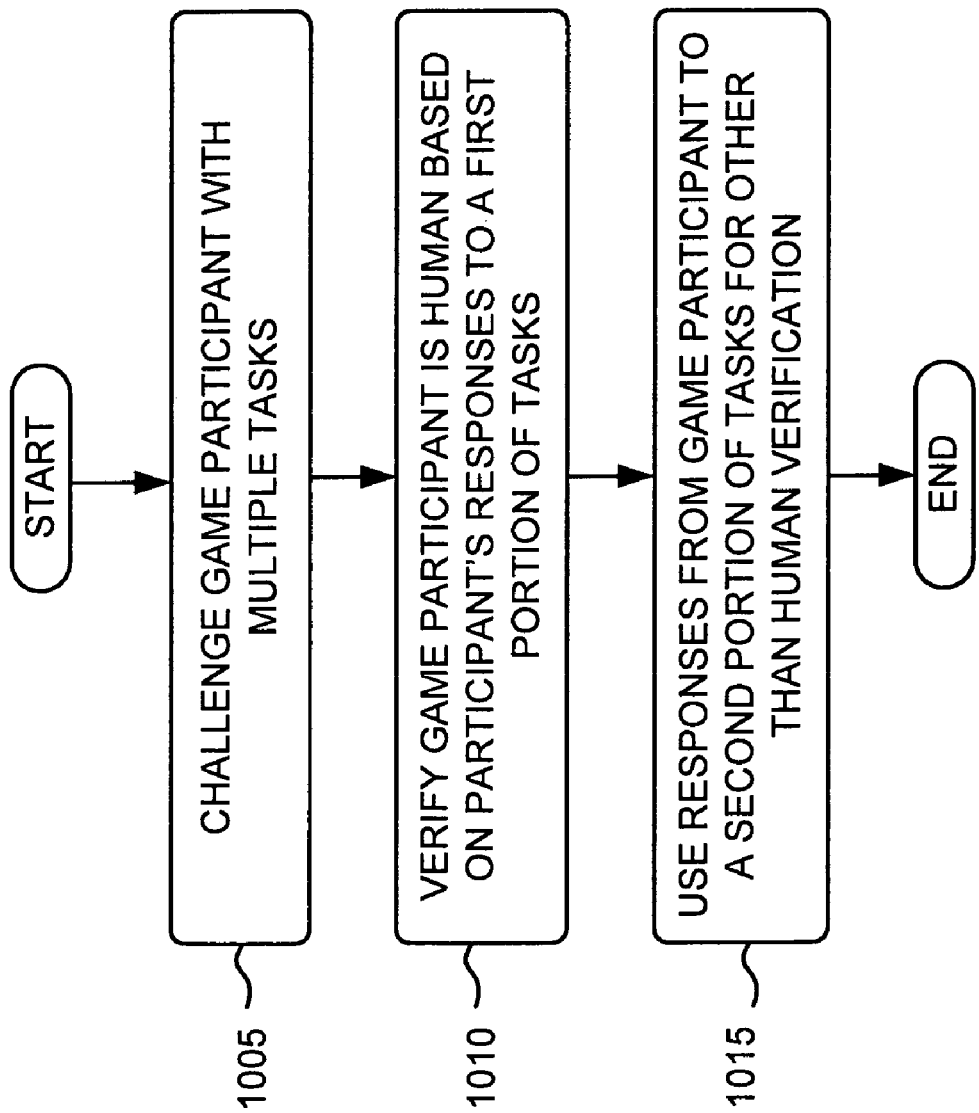

USING GAME RESPONSES TO GATHER DATA

CROSS REFERENCE TO RELATED APPLICATION

The instant application claims priority from provisional application No. 60/632,706, filed Dec. 3, 2004, the disclosure of which is incorporated by reference herein in its entirety.

BACKGROUND

1. Field of the Invention

Implementations consistent with the principles of the invention relate generally to data gathering and, more particularly, to using game responses to gather data.

2. Description of Related Art

Existing information searching systems use search queries to search data to retrieve specific information that corresponds to the received search queries. Such information searching systems may search information stored locally, or in distributed locations. The World Wide Web ("web") is one example of information stored in distributed locations. The web contains a vast amount of information, but locating a desired portion of that information can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web documents. Web documents that contain the user's search terms are "hits" and are returned to the user.

SUMMARY OF THE INVENTION

According to one aspect, a computer-implemented method may include retrieving a first set of question-type queries from a query log having known answers and retrieving a second set of question-type queries from the query log having unknown answers. The method may further include posing the first and second sets of queries to multiple users and receiving the users' answers to the first and second sets of queries. The method may also include aggregating the answers from the users to the second set of queries and determining correct answers for at least some of the queries of the second set of queries using the aggregated answers.

According to another aspect, a method may include providing a first digital image to multiple game participants and receiving first words from the multiple participants in response to the first digital image. The method may further include identifying the first words as related terms or synonyms.

According to a further aspect, a method may include eliciting user participation in a game hosted by a server and gathering data resulting from the user participation in the game. The method may further include using the gathered data for search related functions performed by a search engine.

According to an additional aspect, a method may include providing a digital image to multiple game participants and associating a first word in a first language with the digital image. The method may further include receiving a second word from a first one of the multiple participants in a second language in response to the digital image, where the second language is different than the first language. The method may also include identifying the second word as being a language translation of the first word into the second language.

According to a further aspect, a method may include challenging a game participant with multiple tasks, where a first portion of the tasks have known responses and a second portion of the tasks have unknown responses. The method may also include verifying that the game participant is human based on the participant's responses to the first portion of the tasks and using the participant's responses to the second portion of the tasks for purposes other than human verification.

BRIEF DESCRIPTION OF THE DRAWINGS

The accompanying drawings, which are incorporated in and constitute a part of this specification, illustrate embodiments of the invention and, together with the description, explain the invention. In the drawings.

FIGS. 4A, 4B and 4C are flowcharts of an exemplary process for analyzing participants' answers to quiz questions to determine correct answers for at least some of the quiz questions consistent with principles of the invention;

FIG. 6 is a diagram of an exemplary overview of the use of image labels for identifying the labels associated with an image as related terms;

FIGS. 7A and 7B are flowcharts of an exemplary process for providing labels for images, and for identifying the image labels as related terms;

FIG. 10 is a flowchart of an exemplary process, consistent with principles of the invention, for using participant responses to multiple tasks to verify whether the participant is a human.

DETAILED DESCRIPTION

The following detailed description of the invention refers to the accompanying drawings. The same reference numbers in different drawings may identify the same or similar elements. Also, the following detailed description does not limit the invention.

A "document," as the term is used herein, is to be broadly interpreted to include any machine-readable and machinestorable work product. A document may include an e-mail, a web site, a file, one or more digital images, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as JavaScript, etc.). A "link" as the term is used here, is to be broadly interpreted to include any reference to or from a document.

Exemplary Network Configuration

Figure 1:
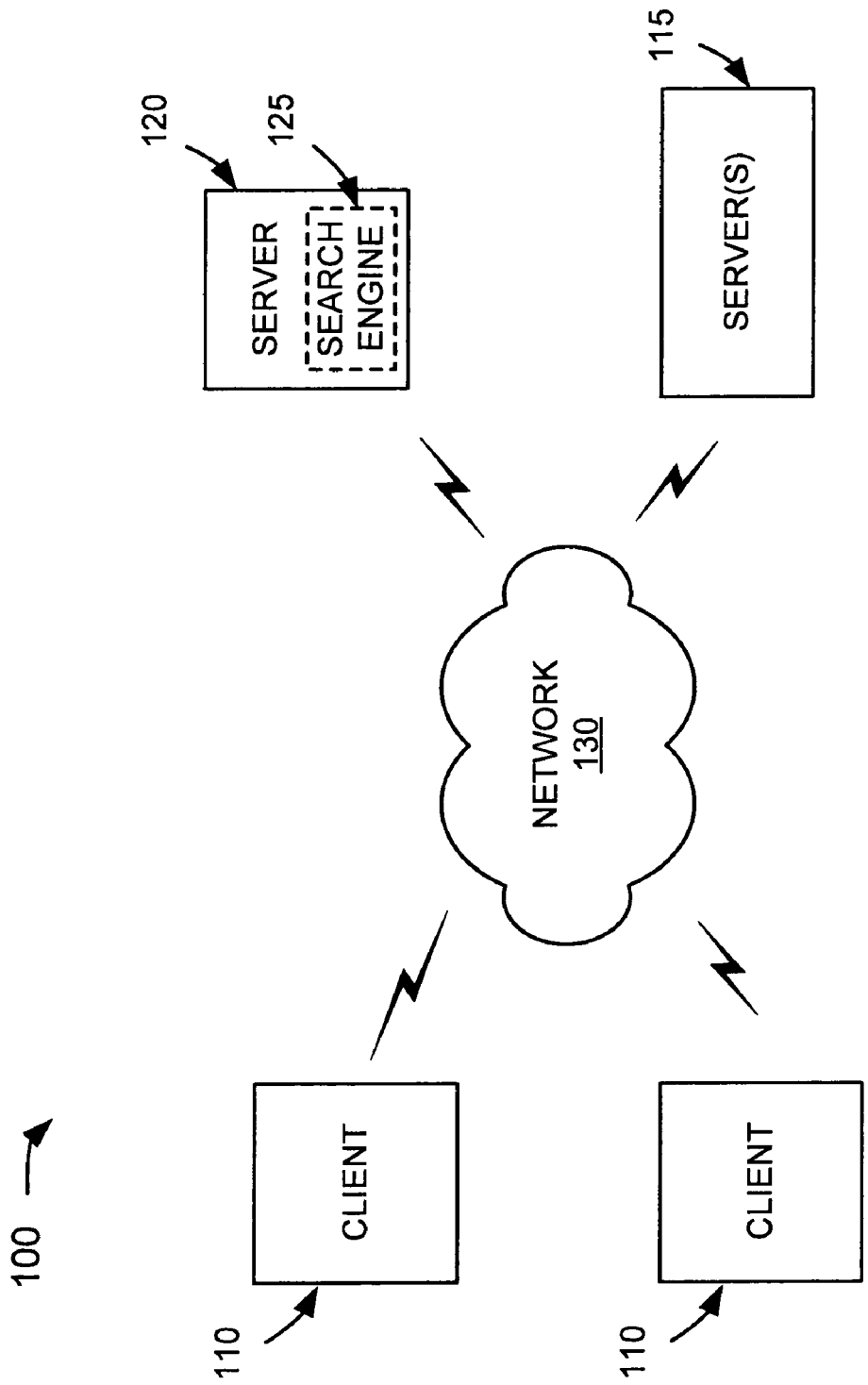
FIG. 1 is a diagram of an exemplary network in which systems and methods consistent with principles of the invention may be implemented.

FIG. 1 is an exemplary diagram of a network 100 in which systems and methods consistent with the principles of the invention may be implemented. Network 100 may include multiple clients 110 connected to multiple servers 120 and 115 via a network 130. Network 130 may include a local area network (LAN), a wide area network (WAN), a telephone network, such as the Public Switched Telephone Network (PSTN), an intranet, the Internet, a memory device, or a combination of networks. Two clients 110 and two servers 120 and 115 have been illustrated as connected to network 130 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 120 and 115 may include server entities that access, fetch, aggregate, process, search, and/or maintain documents in a manner consistent with the principles of the invention. Clients 110 and servers 120 and 115 may connect to network 130 via wired, wireless, and/or optical connections.

In an implementation consistent with the principles of the invention, server 120 may include a search engine 125 usable by users at clients 110. Server 120 may implement a data aggregation service by crawling a corpus of documents (e.g., web pages) hosted on data server(s) 115 and store information associated with these documents in a repository of crawled documents. The data aggregation service may be implemented in other ways, such as by agreement with the operator(s) of data server(s) 115 to distribute their hosted documents via the data aggregation service. Search engine 125 may execute a query, received from a user, on the corpus of documents hosted on data server(s) 115. Server 120 may also host various games, as described below with respect to FIGS. 3-10, to gather data for various purposes, such as, for example, search-related functions.

Server(s) 115 may store or maintain documents that may be crawled by server 120. Such documents may include data related to published news stories, products, images, user groups, geographic areas, or any other type of data. For example, server(s) 115 may store or maintain news stories from any type of news source, such as, for example, the Washington Post, the New York Times, Time magazine, or Newsweek. As another example, server(s) 115 may store or maintain data related to specific product data, such as product data provided by one or more product manufacturers. As yet another example, server(s) 115 may store or maintain data related to other types of web documents, such as pages of web sites.

While servers 120 and 115 are shown as separate entities, it may be possible for one or more of servers 120 and 115 to perform one or more of the functions of another one or more of servers 120 and 115. For example, it may be possible that two or more of servers 120 and 115 are implemented as a single server. It may also be possible for a single one of servers 120 or 115 to be implemented as two or more separate (and possibly distributed) devices.

Exemplary Client/Server Architecture

Figure 2:
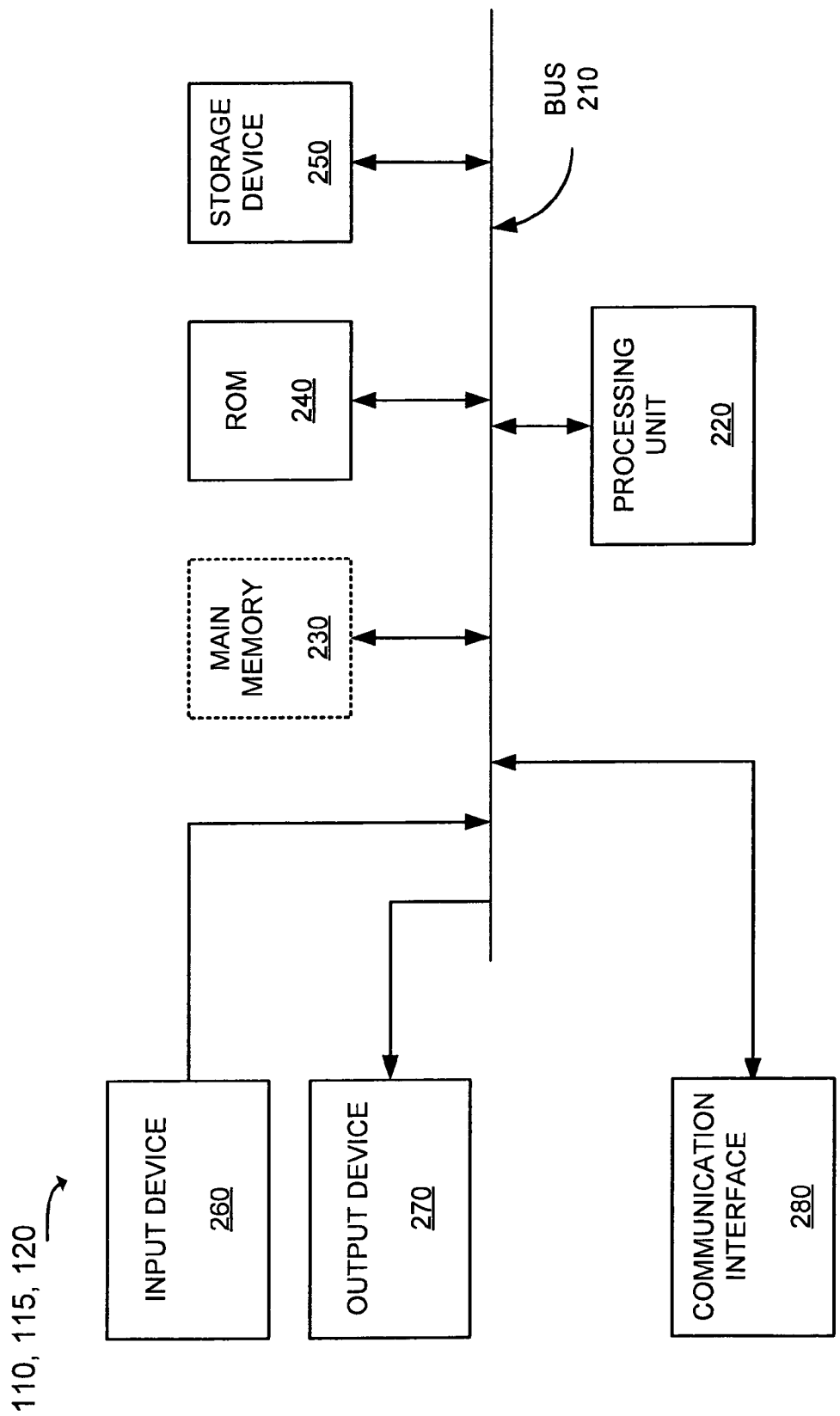
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120 and 115, according to an implementation consistent with the principles of the invention. The client/server entity may include a bus 210, a processing unit 220, an optional main memory 230, a read only memory (ROM) 240, a storage device 250, an input device 260, an output device 270, and a communication interface 280. Bus 210 may include a path that permits communication among the components of the client/server entity.

Processing unit 220 may include any type of software, firmware or hardware implemented processing device, such as a microprocessor, a field programmable gate array (FPGA), combinational logic, etc. Main memory 230 may include a random access memory (RAM) or another type of dynamic storage device that stores information and instructions for execution by processing unit 220, if processing unit 220 includes a microprocessor. ROM 240 may include a conventional ROM device or another type of static storage device that stores static information and/or instructions for use by processing unit 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or other biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 130.

As will be described in detail below, the client/server entity, consistent with the principles of the invention, may perform certain data processing operations. The client/server entity may, in some implementations, perform these operations in response to processing unit 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processing unit 220 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Quiz Game Overview

Figure 3:
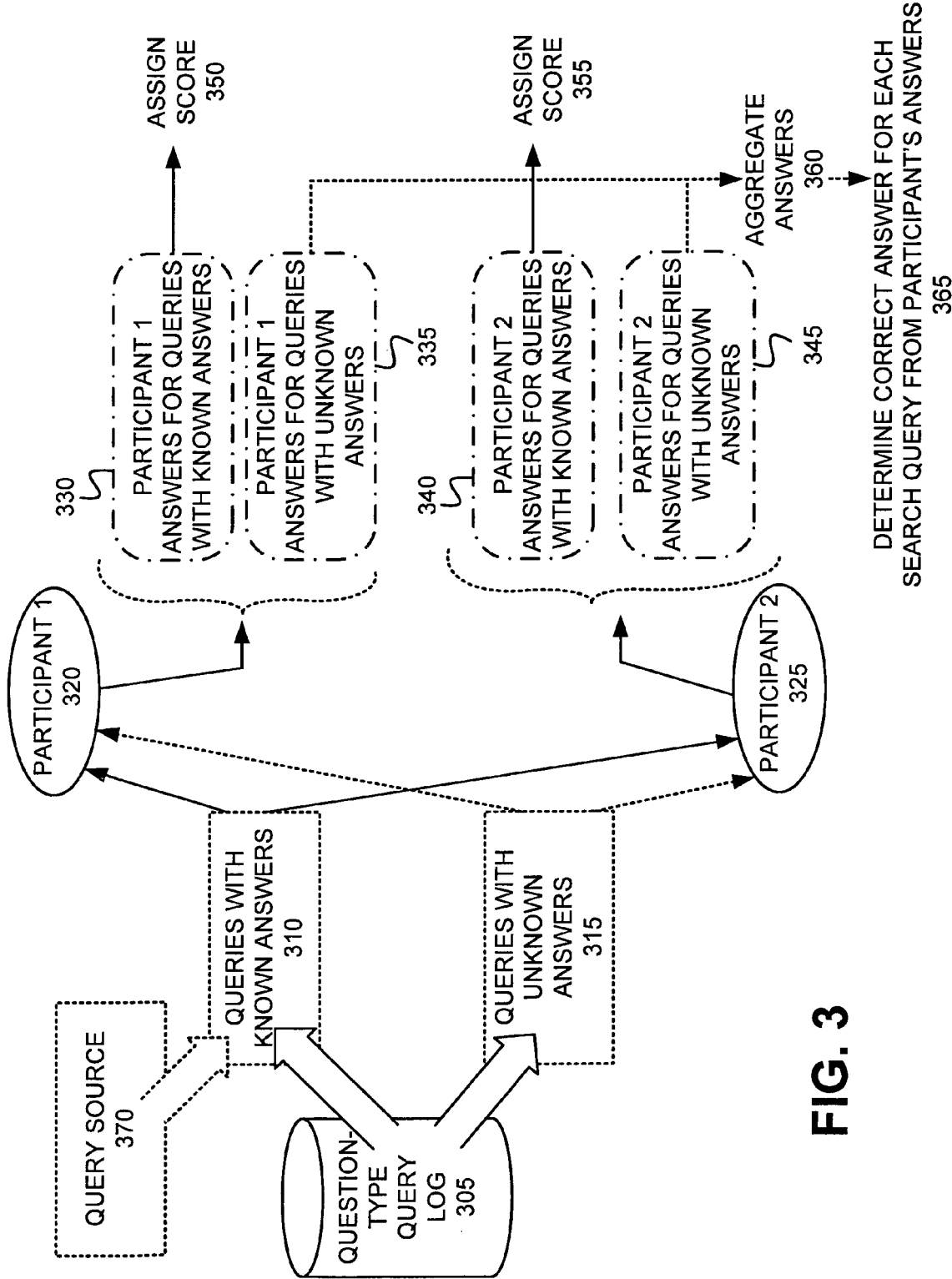
FIG. 3 is a diagram of an overview of an exemplary quiz game used to gather data to support question-type search queries in a search engine consistent with an aspect of the invention.

FIG. 3 illustrates an overview of a game that may be used to gather data to support question-type search queries. A log 305 of question-type search queries may be accumulated from multiple search queries of the form "what is xxx?," "who is xxx?," "where is xxx?," or other types of question formats, received at search engine 125. The question-type queries may be accumulated from one or more users over a period of time. From the question-type query log 305, queries having known answers 310 may be identified, and queries having unknown answers 315 may be identified. For example, the question-type query "where is Akron?" may have the known answer "Ohio." However, the question-type query "who is Joe Smith?" may have an unknown answer. In some implementations, queries having known answers 310 may be retrieved from any query source 370, and need not be retrieved only from query log 305. The queries having known answers 310 and queries with unknown answers 315 may be issued to a participant 320 and a participant 325 from server 120. Participant 320 may provide, to server 120, his answers 330 for the queries with known answers 310, and his answers 335 for the queries with unknown answers 315. A score may be assigned 350, by server 120, to participant 320 based on the participant's own answers 330 to the queries having known answers. For example, a score may be assigned based on a number of the queries that participant 320 answered correctly.

Participant 325 may also provide, to server 120, his answers 340 for the queries with known answers 310, and his answers 345 for the queries with unknown answers 315. A score may also be assigned 355, by server 120, to participant 325 based on the participant's answers 340 to the queries having known answers. A score, for example, may be assigned based on a number of the queries that participant 325 answered correctly.

Participant 1 320's answers 335 to the queries with unknown answers 315, and participant 2 325's answers 345 to the queries with unknown answers 315, may then be aggregated 360. The answers 335 and 345, for example, may be aggregated in a database associated with server 120. A correct answer for each question-type search query may then be determined from the participants' aggregated answers 360. For example, an analysis of the answers 335 and 345 may determine that both participants (or a majority of participants, if more than two participants are involved) chose the same answer for a given question-type query and that, therefore, this answer is the correct answer for the query.

Exemplary Quiz Questioning Process

Figure 4A:
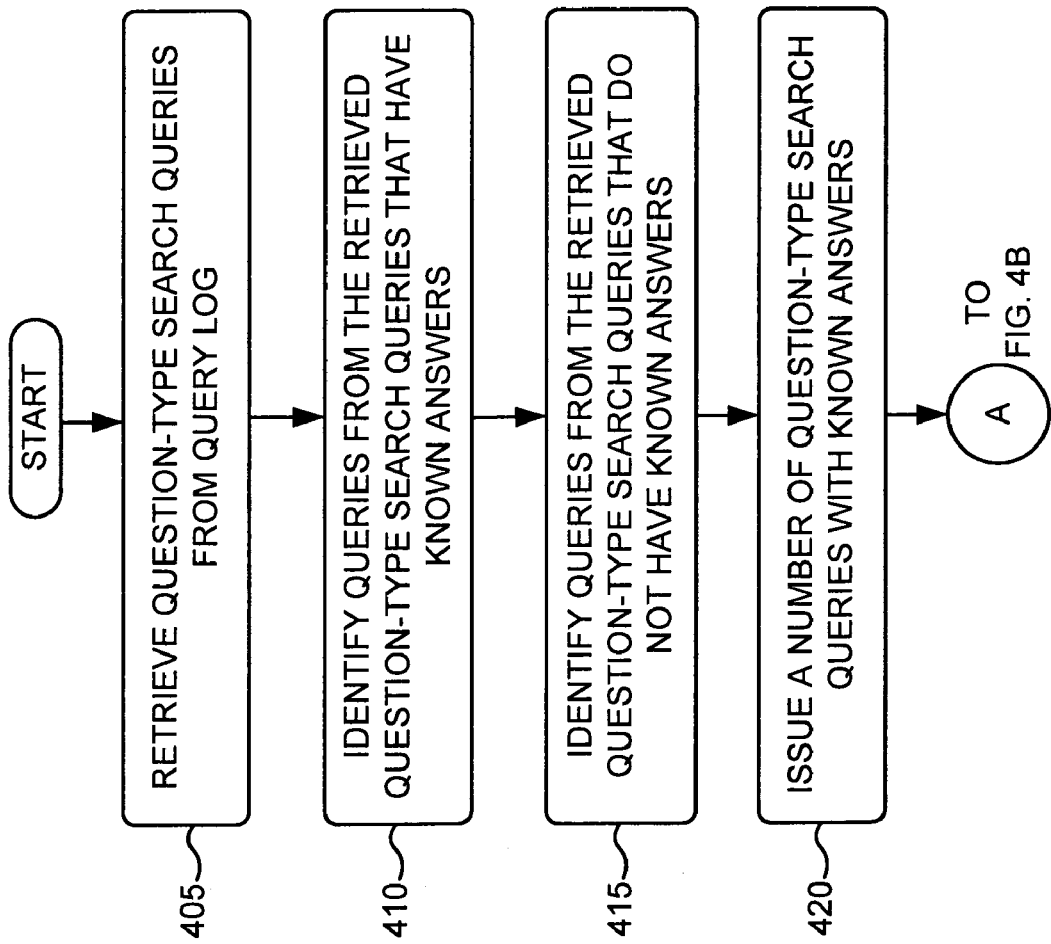

FIGS. 4A, 4B and 4C are flowcharts of an exemplary process, consistent with principles of the invention, for analyzing participants' answers to quiz questions to determine correct answers for at least some of the quiz questions. As one skilled in the art will appreciate, the process exemplified by FIGS. 4A, 4B and 4C can be implemented in software and stored on a computer-readable memory, such as main memory 230, ROM 240 or storage device 250 of server 120. In other implementations, the processing exemplified by FIGS. 4A, 4B and 4C can be implemented in hardwired circuitry, such as combinational logic, within processing unit 220 of server 120.

The exemplary process may begin with the retrieval of question-type search queries from a query log (block 405) (FIG. 4A). The query log may be accumulated from multiple search queries of the form "what is xxx?," "who is xxx?," "where is xxx?," or other types of question formats, received at search engine 125 and stored in a database associated with server 120. Queries from the retrieved question-type search queries that have known answers may be identified (block 410). For example, a portion of the logged question-type search queries may have previously known, correct answers. Queries from the retrieved question-type search queries that do not have known answers may be identified (block 415). For example, a portion of the logged question-type search queries may not have any known, correct answers associated with them. The determination of questions with known or unknown answers may be made based on an analysis of query logs and users' selections of search results. In some implementations, queries having known answers may be retrieved from any source, and need not be retrieved only from the query log.

Figure 5:
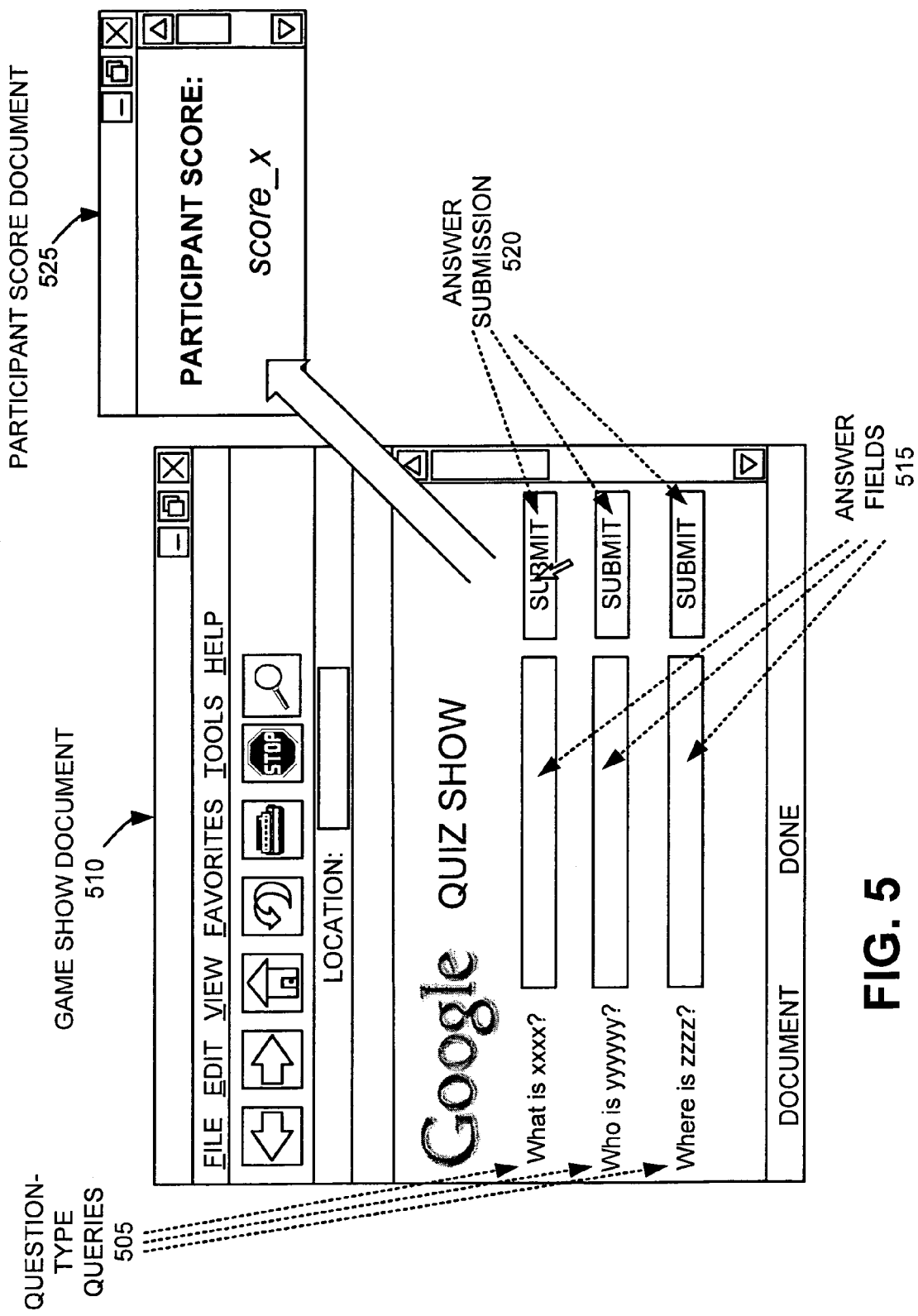
FIG. 5 is a diagram of an exemplary quiz game show document consistent with an aspect of the invention.

A number of question-type search queries, from the retrieved queries with known answers, may be issued to one or more participants (block 420). For example, a set of search queries of the form "who is $X_1$," "what is $X_2$," and "where is $X_3$," may be issued to the one or more participants, where the correct answers to these questions are all known. A number of question-type search queries, from the retrieved queries having unknown answers, may be issued to the one or more participants (block 425) (FIG. 4B). For example, a set of search queries of the form "where is $X_4$," "who is $X_5$," and "what is $X_6$," may be issued to the one or more participants, where the correct answers to these questions are not known. FIG. 5 illustrates the issuance of question-type queries 505 to a participant via a game show document 510.

Answers, for each issued question-type search query, may be received from the participant(s) (block 430). As shown in FIG. 5, a participant may enter his answers in answer fields 515 in game show document 510 and submit them via, for example, an answer submission 520 "button." In another implementation, a document may present several candidate answers in a multiple choice format to a participant, and the participant may choose his answer from the several candidate answers. A determination may then be made, for each participant, how many of the question-type search queries having known answers that the participant answered correctly (block 435). A score may be assigned to each participant based on the number of the question-type search queries, having known answers, that the participant answered correctly (block 440). For example, if a given participant answered 90 of 100 question-type search queries having known answers correctly, then the participant may be assigned a score of 90%. As shown in FIG. 5, a participant score document 525 may be presented to the participant indicating the participant's assigned score.

The answers received from the participant(s) may be aggregated (block 445) (FIG. 4C) and stored in a memory, such as memory 230 of server 120, or in a database associated with server 120. A correct answer for each of the question-type search queries having unknown answers may be determined using the aggregated answers (block 450). The answers from the participants, for the question-type search queries having unknown answers, may be analyzed to ascertain which answer has been given the most for a specific question-type query. The answer that has been given the most by participants for a specific query may be determined to be the correct answer. For example, if there have been 100 participants, and 10 of the participants selected the same answer, but everyone else selected different answers, then the answer picked by the 10 participants may not actually be the "correct" answer. A given answer may have to be selected a minimum number of times to be considered the "correct" answer. If each participant selected an answer from a multiple choice list of candidate answers, then the answer that was chosen by a majority of participants may be determined to be the correct answer for the question-type query. In one implementation, the answers given by participants that have been assigned a high score (see block 440 above) may be weighted more heavily when determining a correct answer for each of the question-type search queries. Weighting high scoring participants more heavily when determining a correct answer for a search query may remove the activity of "bots" (i.e., computer programs that run automatically), since "bots" would likely not answer the question-type queries correctly that have previously known answers. The determined "correct" answers to queries with previously unknown answers may be used by a search engine for answering subsequently received question-type search queries.

Exemplary Image Labeling Game Overview

FIG. 6 illustrates an exemplary overview of the use of image labels for identifying the labels associated with an image as related terms to one another. Multiple images (e.g., images 615-1 through 615-4) may be presented to multiple participants (e.g., participant 605 and participant 610). The images may include, for example, digital images in any digital image format (e.g., MPEG, JPEG, etc.). For each image 615, each participant (e.g., participants 605 and 610) may supply a guess word (e.g., guess words 620-1 through 620-4 for participant 605 and guess words 625-1 through 625-4 for participant 610) that the participant believes describes the presented image. Each guess word supplied by a participant may then be identified as an image label (i.e., guess word 1_1 620-1 identified as label 1_1 630-1 for image 1 615-1; guess word 2_2 625-2 identified as label 2_2 635-2, etc.). The identified image labels may then also be identified as related terms. For example, as shown in FIG. 6, label 1_1 and label 2_1, previously supplied as guess words from participant 605 and participant 610 for image 1 615-1, may be identified as "related terms." The labels identified as "related terms" may, for example, represent synonyms of one another, or be otherwise related.

If the participants to the image labeling game are playing the game in different countries, the identification of image labels as "related terms" may be used for language translation also. For example, if participants playing from France label the image of a car "voiture," it can be inferred that "voiture" is French for "car." This technique may be particularly useful in translating languages that are more obscure than French.

Exemplary Image Labeling Process

Figure 7A:
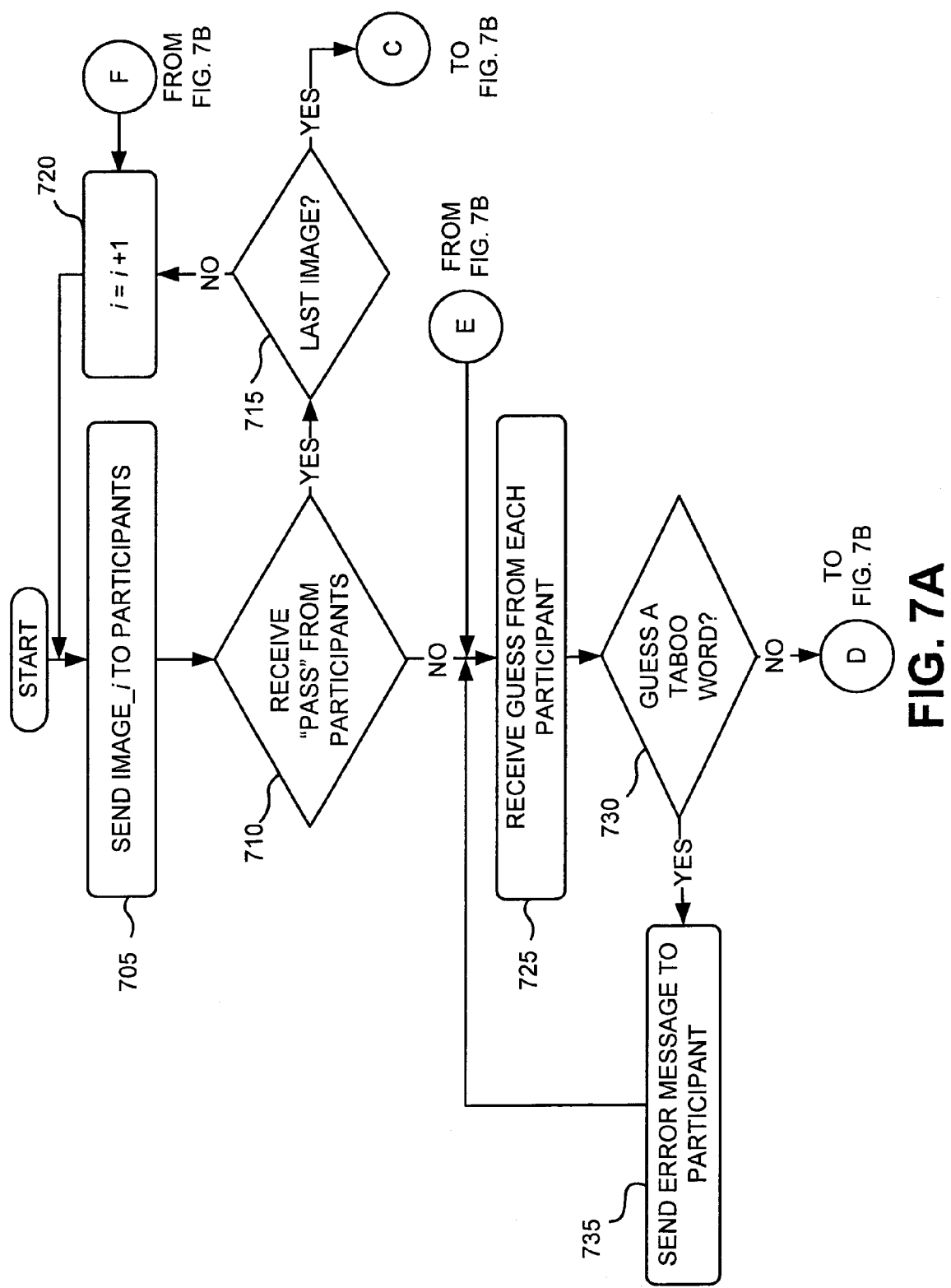

FIGS. 7A and 7B are flowcharts of an exemplary process, according to an implementation consistent with the principles of the invention, for providing labels for images, and for identifying the image labels as related terms. As one skilled in the art will appreciate, the process exemplified by FIGS. 7A and 7B can be implemented in software and stored on a computer-readable memory, such as main memory 230, ROM 240 or storage device 250 of server 120. In other implementations, the processing exemplified by FIGS. 7A and 7B can be implemented in hardwired circuitry, such as combinational logic, within processing unit 220 of server 120.

Figure 8:
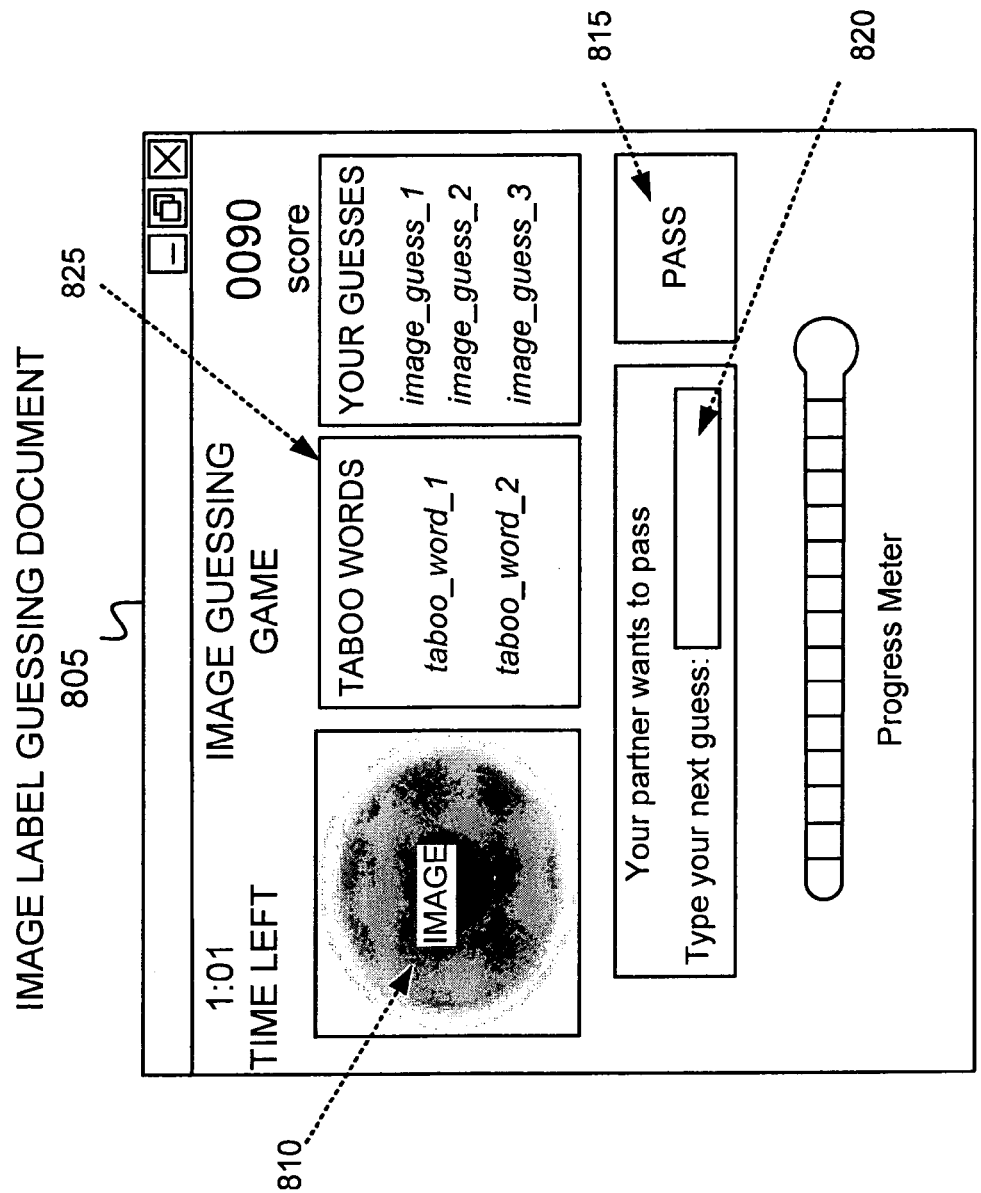
FIG. 8 is a diagram of an exemplary image label guessing document consistent with an aspect of the invention.

The exemplary process may begin with sending an image (image_i) to game participants (block 705) (FIG. 7A). Multiple participants may participate in each image labeling game. The image may be retrieved from memory and sent from server 120 to each participant at a client 110. FIG. 8 illustrates an exemplary image label guessing document 805, that is sent to each game participant, and that includes an image 810. A determination may be made whether a "pass" has been received from the participants (block 710), meaning that the participant does not have a label for image 810. A participant may indicate a "pass" via, for example, a "pass" button 815 provided in document 805 provided to the participant, as shown in FIG. 8. If a "pass" has been received from the participants, a determination may be made whether the image (image_i) is the last image (block 715). Each game may only include a given sequence of images, spanning a first image to a last image. If the image is not the last image, then a counter i, used to designate a particular image in an image sequence, may be incremented (i=i+1) (block 720). If the image is the last image, then the exemplary process may continue at block 765 below.

Returning to block 710, if a "pass" has not been received from the participants, then a guess may be received from each participant (block 725). For example, each participant may type their next guess word in field 820 of document 805, as shown in FIG. 8. A determination may then be made whether any of the guesses is a "taboo" word (block 730). A "taboo" word may include a word that the game has excluded as an acceptable label for a given image. As shown in FIG. 8, document 805 may, for each image 810, present a list 825 of "taboo" words to each participant. If any of the guesses from the participants of the game is a "taboo" word, then an error message may be sent to the participant who submitted the "taboo" word (block 735), and the exemplary process may return to block 725 above. If none of the guesses are "taboo" words, then a determination may be made whether the guesses of the participants match (block 740) (FIG. 7B). For example, if there are two participants to the game, then both participants may submit guess words that match. If the participants have not submitted matching guess words, then a determination may be made whether a time period has expired (block 745). The time period may be configurable, and may represent an allotted amount of time that the participants to the game have to provide matching labels for a given image. If the time period has not expired, then the exemplary process may return to block 725 above. If the time period has expired, then the exemplary process may return to block 720 above with the sending of a new image (image_i+1) to the game participants.

Returning to block 740, if the guesses of the participants match, then the matching guesses may be stored as a label for the image (image_i) sent to the participants (block 750). A determination may be made whether the image is the last image (block 755). If not, then the exemplary process may return to block 720 above. If the image is the last image, then, in one implementation, labels associated with each image, from multiple games, or possibly multiple, different participants, may be identified as related terms (block 760). Labels, associated with each image, may be aggregated from multiple different games and the labels may be identified as "related." The image labels may be identified, for example, as synonyms. The labels (and their synonyms) may be used by a search engine for, for example, supplying related search terms for a given input search term.

In another implementation, if the image is the last image, then a given label from a participant in a first country in a first language may be identified as a language translation of a corresponding label from a participant in a second country in a second language (block 765). For example, if one of the participants to the image labeling is playing the game in the United States in English, and labels an image of an automobile a "car," and another participant is playing the game in France in French, and labels the image of the automobile "voiture," it can be inferred that "voiture" is French for "car." "Voiture," thus, may be identified as the French translation of the English label "car."

Exemplary Game Challenge Overview

Figure 9:
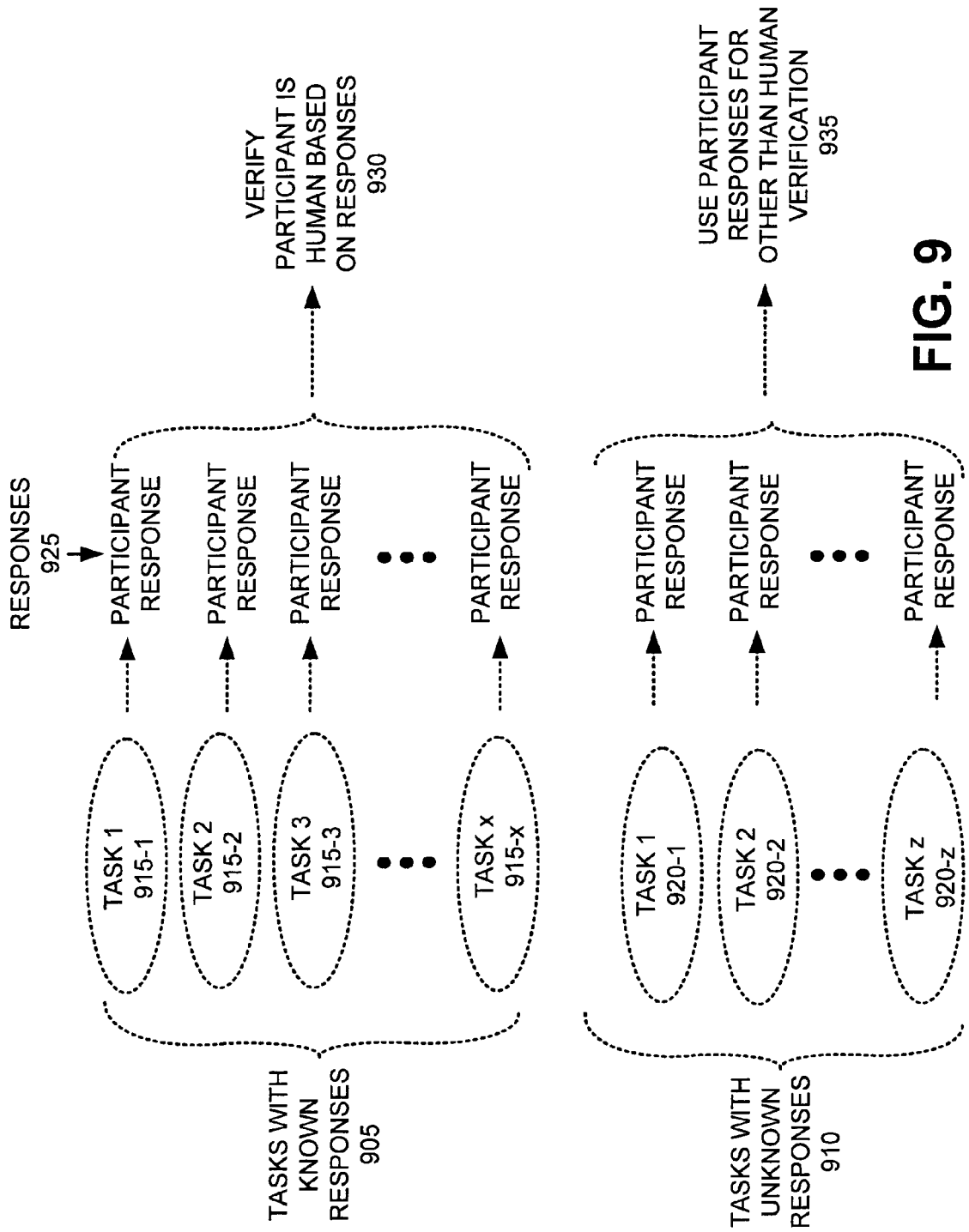
FIG. 9 is a diagram of an overview of a game challenge, according to an exemplary aspect of the invention, in which a game participant is challenged with multiple tasks, and a portion of the participant's responses are used to verify that the participant is a human participant, and another portion of the participant's responses are used for purposes other than human verification.

FIG. 9 illustrates an exemplary overview of a game challenge, according to an exemplary aspect of the invention, in which a game participant is challenged with multiple tasks, and a portion of the participant's responses are used to verify that the participant is a human participant, and another portion of the participant's responses are used for purposes other than human verification. As shown in FIG. 9, a participant may be challenged with multiple tasks, with a portion 905 of the tasks being tasks that have known responses, and another portion 910 of the tasks being tasks that have unknown responses 910. The tasks may include any type of task, such as labeling an image, as described above with respect to FIGS. 6-8, or answering questions, as described above with respect to FIGS. 3-5.

The participant may provide a response 925 to each task 915-1 through 915-$x$ having known responses, and to each task 920-1 through 920-$z$ having unknown responses. The participant may be verified 930 as being human based on the responses 925 to each task having known responses. For example, if the task involves the participant providing answers to question-type queries, then the participant's responses 925 to tasks 915-1 through 915-$x$ can be compared to the known response to those questions to verify whether the participant is human, or whether the participant may possibly be a "bot". A "bot" may not respond correctly to the tasks to which the correct responses are known. The participant responses 925 to the tasks 920-1 through 920-$z$ having unknown responses may be used 935 for purposes other than human verification. For example, as described above with respect to FIGS. 3-5, participant answers to question-type queries that have unknown answers may be used to determine a correct answer to the question-type queries. As another example, as described above with respect to FIGS. 6-8, image guess words provided by game participants may used as related terms.

Exemplary Process

FIG. 10 is a flowchart of an exemplary process, according to an implementation consistent with the principles of the invention, for using participant responses to multiple tasks to verify whether the participant is a human. As one skilled in the art will appreciate, the process exemplified by FIG. 10 can be implemented in software and stored on a computer-readable memory, such as main memory 230, ROM 240 or storage device 250 of server 120. In other implementations, the processing exemplified by FIG. 10 can be implemented in hardwired circuitry, such as combinational logic, within processing unit 220 of server 120.

The exemplary process may begin with challenging a game participant with multiple tasks (block 1005). Server 120 may send the multiple tasks to the game participant at a client 110 via network 130. The multiple tasks may include any type of task, such as issuing question-type queries to a participant, or presenting an image for the participant to label. Prior to the start of the game, correct responses to a first portion of the multiple tasks are identified, and correct responses to a second portion of the tasks are determined to be unknown. The game participant may then be verified as being human based on the participant's responses to the first portion of tasks (block 1010). The participant's responses to the tasks having known responses may be compared with the correct responses to determine how many of the participant's responses are incorrect. A high error rate may indicate that the participant is not human, and may, for example, be a "bot." Responses identified as being potentially from a non-human source, such as a "bot" may be discarded. Responses from the game participant to the second portion of tasks may then be used for other than human verification (block 1015). For example, as described above with respect to FIGS. 3-5, participant answers to question-type queries that have unknown answers may be used to determine a correct answer to the question-type queries. As another example, as described above with respect to FIGS. 6-8, image guess words provided by game participants may used as related terms.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4A, 4B, 4C, 7A, 7B and 10, the order of the acts may be modified in other implementations consistent with the principles of the invention. For the processes described with respect to FIGS. 4A, 4B, 4C, 7A, 7B and 10, answers or responses from game participants may be solicited from participants in many different ways than those described. In some implementations, answers or responses may be solicited using freeform input (e.g., if the correct answer/response is not known), or they may be solicited using a multiple choice format (i.e., if a set of candidate answers/responses is known that is believed to include a correct answer/response). Additionally, participants may be incentivized to play the games described above with respect to FIGS. 4A, 4B, 4C, 7A, 7B and 10. Game participants may be rewarded (i.e., monetarily or otherwise) for participating in the games, and rewards may be used to leverage a significant number of participants to participate in the games. In some implementations, only a small subset of participants may be rewarded (e.g., a reward lottery), but the participants may not now who will receive the reward until some time after participating in a given game.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more processors associated with one or more server devices, the method comprising:
   eliciting, by one or more processors associated with the one or more server devices, user participation in a game by posing queries from a query log to a user, where the query log comprises search queries previously submitted by one or more users;
   gathering, by one or more processors associated with the one or more server devices, first information resulting from the user participation in the game;
   gathering, by one or more processors associated with the one or more server devices, second information, which is different than the first information, resulting from the user participation in the game;
   assigning, by one or more processors associated with the one or more server devices, a score to the user based on the gathered first information;
   assigning, by one or more processors associated with the one or more server devices, a weight to the gathered second information based on the assigned score; and
   using, by one or more processors associated with the one or more server devices, the weighted, gathered, second information to answer queries subsequently posed to the one or more users.

2. The method of claim 1, where the user participates in the game via a network connected to the one or more server devices.

3. The method of claim 1, where eliciting the user participation in the game comprises:
   retrieving, from the query log, a first set of queries and retrieving answers associated with the first set of queries,
   retrieving, from the query log, a second set of queries that do not have associated answers, and
   posing, to the user, at least one query from the first set and at least one query from the second set.

4. The method of claim 3, where using the weighted, gathered, second information to answer queries, subsequently posed to the one or more users, comprises:
   assigning, based on the score assigned to the user, the weight to the user's answer to the at least one query from the second set;
   receiving the at least one query from the second set, as a query from another user;
   selecting, based on the weight, the user's answer to the at least one query from the second set; and
   providing the selected answer to the other user in response to receiving the at least one query from the second set, as a query from the other user.

5. The method of claim 3, where assigning the score to the user comprises:
   assigning, to the user, the score based on whether the received answer to the at least one query from the first set matched a retrieved answer associated with the at least one query from the first set.

6. The method of claim 1, where gathering the first information comprises:
   receiving answers, from the user, to the at least one query from the first set; and
   gathering the second information comprises:
   receiving answers, from the user, to the at least one query from the second set.

7. A computer-readable memory device comprising processing instructions executable by one or more processors, the processing instructions comprising:
   instructions for retrieving a first set of queries from a query log that comprises search queries previously submitted by one or more users;
   instructions for retrieving answers associated with the first set of queries from the query log;
   instructions for retrieving a second set of queries from the query log that do not have associated answers in the query log;
   instructions for posing, to multiple users, at least one query from the first set of queries and at least one query from the second set of queries;
   instructions for receiving answers to the at least one query from the first set and the at least one query from the second set;
   instructions for aggregating the answers to the at least one query from the second set;
   instructions for comparing answers to the at least one query from the first set to a retrieved answer associated with the at least one query from the first set;
   instructions for assigning a score to each particular user, of the multiple users, based on a quantity of answers, received from the particular user, to queries from the first set of queries that match retrieved answers associated with the first set of queries; and
   instructions for selecting an answer for the at least one query from the second set of queries based on the aggregated answers and scores assigned to the multiple users.

8. The computer-readable memory device of claim 7, where the instructions for selecting the answer comprise:
   instructions for selecting an answer that was received from at least a particular quantity of users.

9. The computer-readable memory device of claim 7, where the queries are associated with images.

10. A method performed by one or more processors of one or more computer devices, comprising:
    retrieving, by at least one of the one or more processors, a set of first queries from a query log that comprises search queries previously submitted by one or more users, where each of the first queries includes a question for which an answer has been previously identified;
    retrieving, by at least one of the one or more processors, a set of second queries from the query log, where each of the second queries includes a question that does not have an associated answer in the query log;
    posing, by at least one of the one or more processors, a plurality of questions to a plurality of users, where the plurality of questions includes a plurality of the first queries and at least one of the second queries;
    receiving, by at least one of the one or more processors, answers to the plurality of questions from the plurality of users;
    determining, by at least one of the one or more processors, a score reflecting an accuracy of each of the plurality of users based on the answers, provided by each of the plurality of users, that correspond to the first queries and that match the answers previously identified for the first queries; and
    selecting, by at least one of the one or more processors, one of the answers for the at least one of the second queries based on the answers provided by the plurality of users and the scores for the plurality of users.

11. The method of claim 9, where selecting one of the answers for the at least one of the second queries further comprises:

selecting the one of the answers based on (1) a weight given to each of the plurality of users, where the weight is based on the score associated with a respective user of the plurality of users, and (2) based on answers provided by a majority of the plurality of users.

12. The method of claim 10, further comprising:
verifying that a user, of the plurality of users, is human based on the answers that correspond to the first queries.

13. The method of claim 10, further comprising:
generating the answers to the first queries based on the answers that correspond to the second queries.

14. A system comprising:
at least one processor to:
elicit user participation in a game by posing queries from a query log to a user, where the query log comprises search queries previously submitted by one or more users;
gather first information resulting from the user participation in the game;
gather second information, which is different than the first information, resulting from the user participation in the game;
assign a score to the user based on the gathered first information;
assign a weight to the gathered second information based on the assigned score; and
answer queries subsequently posed to the one or more users based on the weighted, gathered, second information.

15. The system of claim 14, where the user participates in the game via a network connected to the one or more server devices.

16. The system of claim 14, where, when the at least one processor is to elicit the user participation in the game, the at least one processor further is to:
retrieve, from the query log, a first set of queries and retrieve answers associated with the first set of queries, retrieve, from the query log, a second set of queries that do not have associated answers, and pose, to the user, at least one query from the first set and at least one query from the second set.

17. The system of claim 16, where, when the at least one processor is to answer the queries, subsequently posed to the one or more users, the at least one processor further is to:
assign, based on the score assigned to the user, the weight to the user's answer to the at least one query from the second set;
receive the at least one query from the second set, as a query from another user;
select, based on the weight, the user's answer to the at least one query from the second set; and
provide the selected answer to the other user in response to receiving the at least one query from the second set, as a query from the other user.

18. The system of claim 16, where, when the at least one processor is to assign the score to the user, the at least one processor further is to:
assign, to the user, the score based on whether the received answer to the at least one query from the first set matched a retrieved answer associated with the at least one query from the first set.

19. The system of claim 14, where, when the at least one processor is to gather the first information, the at least one processor further is to:
receive, from the user, answers, to the at least one query from the first set; and when the at least one processor is to gather the second information, the at least one processor further is to:
receive, from the user, answers to the at least one query from the second set.

20. A system comprising:
at least one processor to:
retrieve a first set of queries from a query log that comprises search queries previously submitted by one or more users;
retrieve answers associated with the first set of queries from the query log;
retrieve a second set of queries from the query log that do not have associated answers in the query log;
pose, to multiple users, at least one query from the first set of queries and at least one query from the second set of queries;
receive answers to the at least one query from the first set and the at least one query from the second set;
aggregate the answers to the at least one query from the second set;
compare answers to the at least one query from the first set to a retrieved answer associated with the at least one query from the first set;
assign a score to each particular user, of the multiple users, based on a quantity of answers, received from the particular user, to queries from the first set of queries that match retrieved answers associated with the first set of queries; and
select an answer for the at least one query from the second set of queries based on the aggregated answers and scores assigned to the multiple users.

21. The system of claim 20, where, when the at least one processor is to select the answer, the at least one processor further is to:
select an answer that was received from at least a particular quantity of users.

22. The system of claim 20, where the queries are associated with images.

23. A system comprising:
at least one processor to:
retrieve a set of first queries from a query log that comprises search queries previously submitted by one or more users, where each of the first queries includes a question for which an answer has been previously identified;
retrieve a set of second queries from the query log, where each of the second queries includes a question that does not have an associated answer in the query log;
pose a plurality of questions to a plurality of users, where the plurality of questions includes a plurality of the first queries and at least one of the second queries;
receive answers to the plurality of questions from the plurality of users;
determine a score reflecting an accuracy of each of the plurality of users based on the answers, provided by each of the plurality of users, that correspond to the first queries and that match the answers previously identified for the first queries; and
select one of the answers for the at least one of the second queries based on the answers provided by the plurality of users and the scores for the plurality of users.

24. The system of claim 23, where, when the at least one processor is to select the one of the answers for the at least one of the second queries, the at least one processor further is to:
select the one of the answers based on (1) a weight given to each of the plurality of users, where the weight is based on the score associated with a respective user of the plurality of users, and (2) based on answers provided by a majority of the plurality of users.

25. The system of claim 23, where the at least one processor further is to:
verify that a user, of the plurality of users, is human based on the answers that correspond to the first queries.

26. The system of claim 23, where the at least one processor further is to:
generate the answers to the first queries based on the answers that correspond to the second queries.

27. A non-transitory computer program product comprising:
one or more programming instructions to:
elicit user participation in a game by posing queries from a query log to a user, where the query log comprises search queries previously submitted by one or more users;
gather first information resulting from the user participation in the game;
gather second information, which is different than the first information, resulting from the user participation in the game;
assign a score to the user based on the gathered first information;
assign a weight to the gathered second information based on the assigned score; and
answer queries subsequently posed to the one or more users based on the weighted, gathered, second information.

28. The computer program product of claim 27, where the user participates in the game via a network connected to the one or more server devices.

29. The computer program product of claim 27, where the one or more programming instructions to elicit the user participation in the game further comprises one or more programming instructions to:
retrieve, from the query log, a first set of queries and retrieve answers associated with the first set of queries,
retrieve, from the query log, a second set of queries that do not have associated answers, and
pose, to the user, at least one query from the first set and at least one query from the second set.

30. The computer program product of claim 29, where the one or more programming instructions to answer the queries, subsequently posed to the one or more users, further comprises one or more programming instructions to:
assign, based on the score assigned to the user, the weight to the user's answer to the at least one query from the second set;
receive the at least one query from the second set, as a query from another user;
select, based on the weight, the user's answer to the at least one query from the second set; and
provide the selected answer to the other user in response to receiving the at least one query from the second set, as a query from the other user.

31. The computer program product of claim 29, where the one or more programming instructions to assign the score to the user further comprises one or more programming instructions to:
assign, to the user, the score based on whether the received answer to the at least one query from the first set matched a retrieved answer associated with the at least one query from the first set.

32. The computer program product of claim 27, where the one or more programming instructions to gather the first information further comprises one or more programming instructions to:
receive, from the user, answers to the at least one query from the first set; and
the one or more programming instructions to gather the second information further comprises one or more programming instructions to:
receive, from the user, answers to the at least one query from the second set.

33. A non-transitory computer program product comprising:
one or more programming instructions to:
retrieve a first set of queries from a query log that comprises search queries previously submitted by one or more users;
retrieve answers associated with the first set of queries from the query log;
retrieve a second set of queries from the query log that do not have associated answers in the query log;
pose, to multiple users, at least one query from the first set of queries and at least one query from the second set of queries;
receive answers to the at least one query from the first set and the at least one query from the second set;
aggregate the answers to the at least one query from the second set;
compare answers to the at least one query from the first set to a retrieved answer associated with the at least one query from the first set;
assign a score to each particular user, of the multiple users, based on a quantity of answers, received from the particular user, to queries from the first set of queries that match retrieved answers associated with the first set of queries; and
select an answer for the at least one query from the second set of queries based on the aggregated answers and scores assigned to the multiple users.

34. The computer program product of claim 33, where the one or more programming instructions to select the answer further comprises one or more programming instructions to:
select an answer that was received from at least a particular quantity of users.

35. The computer program product of claim 33, where the queries are associated with images.

36. A non-transitory computer program product comprising:
one or more programming instructions to:
retrieve a set of first queries from a query log that comprises search queries previously submitted by one or more users, where each of the first queries includes a question for which an answer has been previously identified;
retrieve a set of second queries from the query log, where each of the second queries includes a question that does not have an associated answer in the query log;
pose a plurality of questions to a plurality of users, where the plurality of questions includes a plurality of the first queries and at least one of the second queries;
receive answers to the plurality of questions from the plurality of users;
determine a score reflecting an accuracy of each of the plurality of users based on the answers, provided by each of the plurality of users, that correspond to the first queries and that match the answers previously identified for the first queries; and select one of the answers for the at least one of the second queries based on the answers provided by the plurality of users and the scores for the plurality of users.

37. The computer program product of claim 36, where the one or more programming instructions to select the one of the answers for the at least one of the second queries further comprises one or more programming instructions to:

select the one of the answers based on (1) a weight given to each of the plurality of users, where the weight is based on the score associated with a respective user of the plurality of users, and (2) based on answers provided by a majority of the plurality of users.

38. The computer program product of claim 36, further comprising one or more programming instructions to:

verify that a user, of the plurality of users, is human based on the answers that correspond to the first queries.

39. The computer program product of claim 36, further comprising one or more programming instructions to:

generate the answers to the first queries based on the answers that correspond to the second queries.

\* \* \* \* \*

UNITED STATES PATENT AND TRADEMARK OFFICE
CERTIFICATE OF CORRECTION

| | | |
|---|---|---|
| PATENT NO. | : 8,032,483 B1 | |
| APPLICATION NO. | : 11/169279 | |
| DATED | : October 4, 2011 | |
| INVENTOR(S) | : Taher Haveliwala et al. | |

It is certified that error appears in the above-identified patent and that said Letters Patent is hereby corrected as shown below:

Column 12, line 65, after "selecting", insert --one--.

Signed and Sealed this
Fifteenth Day of November, 2011

David J. Kappos
*Director of the United States Patent and Trademark Office*